Aug. 11, 1964   D. B. PRICE   3,144,547
IMMERSIBLE VESSEL AND DETACHABLE CONTROL MEANS THEREFOR
Filed Jan. 8, 1959
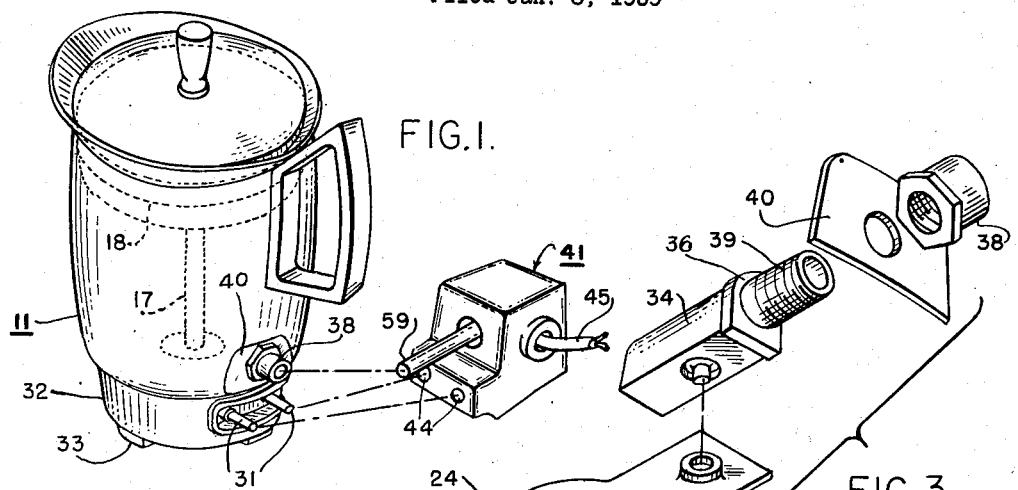
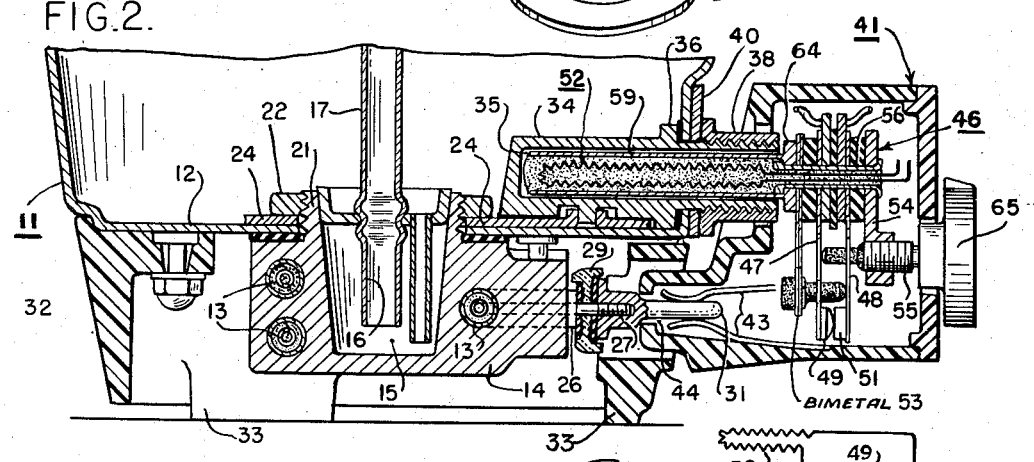
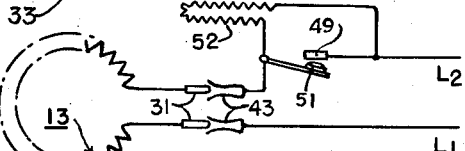
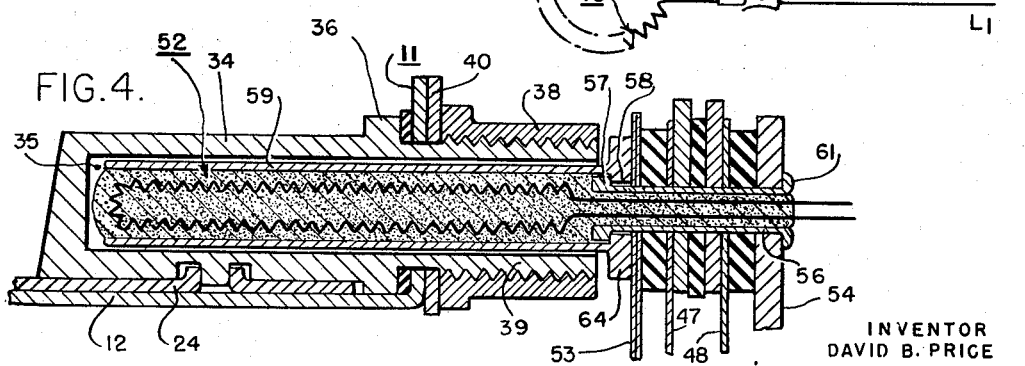
INVENTOR
DAVID B. PRICE
BY Ralph T. French
ATTORNEY

United States Patent Office 3,144,547
Patented Aug. 11, 1964

3,144,547
IMMERSIBLE VESSEL AND DETACHABLE
CONTROL MEANS THEREFOR
David B. Price, Mansfield, Ohio, assignor to Westinghouse
Electric Corporation, East Pittsburgh, Pa., a corporation of Pennsylvania
Filed Jan. 8, 1959, Ser. No. 785,658
17 Claims. (Cl. 219—441)

This invention relates to electrically-heated cooking vessels and has particular utility in electric percolators for brewing coffee and the like.

One object of the invention is to provide an electrically-heated cooking vessel which may be fully immersed during washing without injury to the electrical components thereof.

Another object of the invention is to reduce the number of electrical terminals necessary to be sealed to permit immersion of an electrically-heated cooking vessel utilizing a main heater and a warming heater.

In accordance with the invention, a cooking vessel having side and bottom walls is provided with a main heater to quickly heat the vessel's contents and has means providing a cavity which constitutes a temperature-receiving zone. Preferably, this cavity is located within the cooking portion of the vessel and opens through the side wall. A detachable plug provides electrical connections with the main heater and has a temperature-receiving probe received in the cavity when the plug is attached to the vessel. A warming heater is provided within the probe, and control means within the plug responds to a predetermined temperature received by the probe to render the main heater ineffective and the warming heater effective to retain the vessel contents at serving temperature. With only the main heater built into the vessel, the number of terminals to be sealed against entry of wash water to the heating unit is reduced. The warming heater, the temperature-sensing probe, and the controls are all housed in a plug that is readily separable from the vessel and never requires washing by immersion.

The foregoing and other objects are effected by the invention as will be apparent from the following description taken in connection with the accompanying drawing, forming a part of this application, in which:

FIG. 1 is a perspective view of a percolator constructed in accordance with the present invention, the control plug being shown detached from the percolator;

FIG. 2 is an enlarged vertical sectional view through the control plug and the lower portion of the percolator to which it is attached;

FIG. 3 is an exploded perspective view of the cavity-forming means and parts associated therewith;

FIG. 4 is a greatly enlarged vertical sectional view of the combined probe and warming heater; and FIG. 5 is a diagram of the heater electrical circuits.

While the invention may be utilized with various types of electrically heated cooking vessels, it is herein illustrated as applied to a percolator having a circular side wall 11 and a bottom wall 12. A main heater 13 is provided for heating the contents of the percolator and comprises the usual sheathed element type of heater, preferably cast into a heater block 14 provided with the usual well 15 opening through the top thereof and communicating with the percolator interior. A conventional steam pressure pump 16 extends into the well 15 and lifts liquid from the well through the transfer tube 17 to a conventional perforated ground coffee holder 18 disposed in the upper portion of the percolator.

The heater block 14 is provided with an upwardly-extending, externally-threaded neck 21 received in a centrally disposed opening in the bottom wall 12 and is held in place by a nut 22. A gasket is preferably positioned between the heater block 14 and the bottom wall 12 of the percolator to prevent leakage of fluid from the percolator. There is also provided a strap member 24 (FIGS. 2 and 3), of a material having good heat-conductive characteristics, between the nut 22 and the upper surface of the bottom wall 12, for a purpose to be later explained.

The ends of the sheathed heater 13 project slightly beyond a side surface of the heater block 14, as at 26 (FIG. 2), and include terminal portions 27 for the heating element. The ends of the sheathed heater are sealed by gaskets having insulating washers 29 disposed therebetween provided with recesses in their opposite faces for reception and retention of the gaskets. Sealing pressure is maintained on the gaskets by male terminals 31, threadedly mounted on the projecting threaded ends of the heating element terminal portions 27, thereby insuring that the percolator may be completely immersed in water when the user desires to thoroughly wash the same, and without any danger of wash water getting into the heater 13.

The percolator is provided with the usual base 32, preferably of plastic or other good heat insulating material, the base including a plurality of feet 33.

To suitably control energization of the main heater 13 and particularly to terminate energization thereof when the coffee has reached the proper strength, a novel temperature-receiving mechanism is provided. This mechanism includes a housing 34, preferably positioned in the lower portion of the liquid containing portion of the percolator, adjacent the bottom wall thereof, providing a cavity 35 opening through an end of the housing which projects through the side wall of the percolator. The housing 34 includes a flange portion 36 adapted to engage the inner surface of the percolator side wall 11, with a sealing gasket disposed therebtween. Clamping pressure is maintained upon the gasket by a sleeve nut 38 threadedly received on a mating portion 39 of the housing 34, which portion projects outwardly of the percolator side wall.

Under certain circumstances, it may be desirable to provide, between the clamping sleeve nut 38 and the percolator side wall 11, a plate 40 of a material having having good heat conductivity and emissivity characteristics, for a purpose to be explained later.

An electrical energy conducting and controlling plug 41, which is readily detachable from the percolator, includes a casing of plastic or other suitable non-electrically conducting material and houses in the lower portion thereof a pair of female terminals 43 aligned with openings 44 in the housing which provide for entry of the male terminals 31 of the main heater into the casing for electrical engagement with the female terminals 43. The usual electric supply cord 45 (FIG. 1) supplies electric current to the terminals from any suitable source L1, L2 (FIG. 5).

The plug 41 houses control mechanism, indicated generally at 46, including resilient arms 47 and 48 carrying cooperating contacts 49 and 51, respectively. These contacts, when in engagement, close a shunt circuit which bypasses a warming heater 52 (FIG. 5). The control 46 also includes a bimetallic arm 53 and a supporting arm 54 for an adjusting screw 55. The contact-carrying arms 47 and 48, the bimetallic arm 53 and the supporting arm 54 are all secured in stacked and electrically insulated relation by a steel sleeve 56 having an outwardly flanged end 57 which engages an inwardly directed flange 58 at the inner end of a tubular temperature-receiving probe 59. The opposite end of the steel sleeve 56 is peened over, as at 61, to retain the control elements securely stacked.

The temperature-receiving probe 59 is constructed of a material having good heat conductive characteristics, for example, aluminum, and serves to house the warming heater 52, which may comprise a heating wire embedded in a ceramic cylinder. The probe 59 may also be referred to as a heat-conducting or temperature-transmitting probe.

Steel or some other low-expansion material is used in the sleeve 56, so that expansion thereof due to heat transmitted thereto from the warming heater 52 will be insufficient to produce loosening of the parts held stacked thereby.

In operation, the desired quantities of ground coffee and of water are placed in the percolator and the control plug 41 is connected to the percolator, which provides contact between the male and female terminals of the main heater 13 and locates the temperature-receiving probe 59 and its associated warming heater 52 within the cavity 35 provided by the housing 34. The percolator will heat and circulate water in the usual manner of percolators operating with a well having a steam pump located therein, until such time as the body of brewed coffee within the percolator reaches a predetermined "done" temperature. This temperature will be received by the temperature-receiving probe 59, and the heat picked up thereby will be transmitted therealong to the headed portion 64 thereof against which the control elements are stacked. It will be noted that the bimetallic arm 53 is positioned in direct contact with the headed portion 64 of the probe 59 and, consequently, excellent heat transfer to the bimetallic arm 53 is effected. Heating of the bimetallic arm 53 causes it to flex in a direction tending to separate the cooperating contacts 49 and 51, and the control is so adjusted that, when the desired brew temperature is reached, the contacts will separate, thereby interrupting the previously existing shunting circuit around the warming heater 52.

Since the warming heater 52 is of much higher resistance than the sheathed main heater 13, opening of the shunting circuit will render the main heater 13 substantially ineffective while rendering the warming heater 52 effective. The warming heater will maintain the brewed coffee at a suitable serving temperature. Furthermore, with the warming heater positioned within the tubular probe 59, sufficient heat is transmitted from the heater to the probe to maintain the bimetallic arm 53 at a temperature which will maintain the shunting contacts 49 and 51 separated, thereby insuring that the main heater 13 will not be rendered effective. It will be apparent that the control will operate to maintain these conditions, namely, to maintain the main heater 13 ineffective and the warming heater 52 effective, as long as the plug is connected to the vessel and the control is connected to a source of electrical current to maintain a complete circuit extending through the warming heater. When, however, such circuit is opened, either by detaching the plug 41 from the vessel 11, thereby separating the terminals 43 from the terminals 31 of the vessel, or by disconnecting the cord 45 from the source of current, the warming heater 52 will be deenergized and allowed to cool, in response to which the bimetal 53 will allow the contacts 49 and 51 to reclose. When the bimetal has cooled sufficiently the control will be ready for another coffee making operation.

Preferably, means such as a control knob 65 (FIG. 2) provides for varying the strength of the brewed coffee. To this end, the knob 65 is secured to the adjusting screw 55, carried by the supporting arm 54 and having a portion bearing against the contact carrying arm 47, rotation of the control knob 65 tending to move the contact 49 relative to the cooperating contact 51 to vary the degree to which the bimetallic arm 53 must move in order to separate the contacts.

A contingency which should be provided for in electrically heated percolators is that the percolator may be inadvertently plugged in when there is no liquid therein. Obviously, this will result in overheating of the device and permanent injury thereto unless means is provided for sensing the overheated condition and shutting off the heater before damage is done. In the above disclosed percolator, the bimetallic arm 53 will sense any such excessive heating of the percolator under dry condition operation and shut off the main heater, provided the bottom wall 12 is made of a material having good heat conductive characteristics, for example, aluminum. However, where the bottom wall of the percolator is made of a material having poor heat conductive characteristics, for example, stainless steel, the heater may reach a temperature causing permanent damage to the percolator before sufficient heat reaches the bimetallic arm 53 to cause it to shut off the main heater. To take care of this situation, there may be provided the previously-mentioned metallic strap 24 of a material having good heat conductive characteristics, for example, aluminum, having a loop at one end adapted to surround the threaded neck 21 of the heater plug 14 and to be clamped between the nut 22 and the percolator bottom wall 12, as previously mentioned. This strap 24 includes a portion disposed beneath the housing 34 which provides the cavity 35 for reception of the probe 59. The housing 34 and the strap 24 may be permanently united by interlocking of a pin and flange recess on the members. The strap 24 functions as a heat shunt from the heater block 14 to the housing 34 and probe 59.

Under the conditions just described, the further problem may exist that where the side wall of the percolator is of stainless steel or other material having poor heat conductive characteristics, the heat generated by the warming heater, which comes on when the main heater is cut off, may build up due to lack of liquid in the percolator, to such an extent that the bimetallic arm 53 may be permanently damaged. Therefore, it may be desirable to provide a plate member 40 of a material having good heat conductive and emissivity characteristics in engagement with the percolator side wall 11 in the region of the housing 34 to aid in dissipation of heat generated by the warming heater under conditions of dry operation.

It is believed apparent from the above description that the present invention provides a novel arrangement of the elements usually considered necessary in a well designed percolator, which arrangement renders it feasible to completely immerse the percolator in wash water for cleaning purposes, without any damage to the electrical elements of the device. With this arrangement, only two electrical terminals have to be sealed, and this seal is easily effected in the manner above disclosed. All the remaining electrical mechanism is carried by or contained in the electrical energy conducting and controlling plug 41 which, of course, need not and should not be immersed in liquid.

While the invention has been shown in but one form, it will be obvious to those skilled in the art that it is not so limited, but is susceptible of various changes and modifications without departing from the spirit thereof.

What is claimed is:

1. In an electric percolator: a heating vessel including a side wall and a bottom wall structure defining a well, a main heater surrounding said well, means providing a cavity within said heating vessel above said bottom wall structure and opening through said vessel side wall, and a separable control plug including: means for establishing an electrical circuit through said main heater, a temperature-receiving probe insertable in said cavity, a warming heater within said probe, and control means responsive primarily to the temperature of liquid within said vessel received by said probe for rendering said main heater ineffective and for energizing said warming heater upon attainment of a predetermined temperature of liquid within said vessel.

2. The combination of an electric cooking vessel having bottom and side walls, a main heater for bringing the contents of said vessel to a predetermined desired temperature, means associated with a wall of said vessel and providing a cavity, and a separable control plug including: means for establishing an electric circuit in said main heater, a warming heater insertable into said cavity, and temperature responsive control means for rendering said main heater ineffective and said warming heater effective upon attainment of said predetermined desired temperature of the vessel contents.

3. The combination of an electric cooking vessel, a main heater including electrical terminals, means providing in said vessel a cavity having an opening, and an electrical energy conducting and controlling plug detachable from said vessel, said plug including terminals engageable with said main heater terminals, a temperature-receiving probe adapted to be positioned within said cavity when the first and second-mentioned terminals are engaged, a warming heater housed in said probe, and control means for rendering said main heater ineffective and said warming heater effective upon receiving of a predetermined desired temperature by said probe.

4. The combination of an electric cooking vessel, a main heater including electrical terminals, and a control plug detachable from said vessel, said plug including terminals engageable with said main heater terminals, a probe of high heat conductivity material adapted to be positioned in heat transfer relation to the contents of said vessel when said previously-mentioned terminals are engaged, a warming heater associated with said probe in good heat transfer relation thereto, and control means for said heaters including means providing a circuit shunting said warming heater, a bimetal disposed in good heat transfer relation to said probe and a pair of contacts controlling said circuit and movable into and out of engagement by said bimetal.

5. An electrical energy conducting and controlling plug for an electrically heated vessel comprising
   a probe of good heat conductive material and of tubular form having a radially inwardly directed flange at one end,
   a plurality of arms,
   a pair of cooperating contacts carried by two of said arms,
   at least one of said arms being a bimetal and operable to move one of said contacts into and out of engagement with the other of said contacts,
   and a member of a material having a relatively low coefficient of expansion and formed with an outwardly flanged end disposed within said probe and engaging the inner side of the flange of said probe for retaining said arms and the flange of said probe in stacked relation, with the bimetallic arm disposed in good heat transfer relation to said probe and with said contact carrying arms in electrically insulated relation to each other, whereby tempertaures received by said probe are transmitted to said bimetal.

6. An electric coffee maker comprising
   a vessel having a main heater provided with electrical terminals and means providing a cavity having an opening in the vicinity of said terminals, and
   a control plug attachable to and detachable from said vessel and including
   a heat conducting probe adapted to be inserted into said cavity,
   terminals adjacent said probe and positioned to be engaged with said main heater terminals upon insertion of said probe in said cavity,
   a pair of contacts connected in series with said main heater for controlling energization thereof,
   means arranged in heat transfer relation to said probe for controlling said contacts in response to temperature received by said probe and moving one of said contacts in opening direction upon increase in temperature above a given value, and
   a warming heater of higher resistance than said main heater disposed in said probe and connected in shunt with said contacts, whereby when said contacts open to render said main heater, substantially ineffective, said warming heater is connected in series with said main heater and is energized to provide heat for warming said vessel and to said temperature-responsive means for keeping said contacts open.

7. A temperature control plug for use with an electric cooking vessel comprising
   a housing including
   a heat conducting probe,
   a warming heater in said probe,
   electrical supply conductors,
   terminals associated with said housing arranged to engage other terminals upon movement of the plug into operative engagement with the vessel,
   circuit means connected to the supply conductors for energizing the warming heater and the terminals,
   switching means in the circuit means for controlling the warming heater and the terminals and including a pair of contacts, one of which is connected to one of the terminals,
   the switching means having a first position wherein the warming heater is de-energized and the contacts are closed and a second position wherein the warming heater is energized and the contacts are opened,
   and temperature responsive means for actuating the switching means from said first position to said second position upon increase above a predetermined value in the temperature received by said probe and for maintaining said switching means in said second position at all times, after the shift from the first to the second position, that said temperature remains above said predetermined value,
   said warming heater being of high resistance and of spfficient heating capacity to keep warm the contents of a vessel with which the control plug may be associated and to supply sufficient heat to said temperature responsive means to maintain its temperature above said predetermined value.

8. A temperature control plug for use with an electric cooking vessel comprising
   a casing,
   a heat conducting probe extending from said casing,
   terminals adjacent said probe arranged to engage other terminals upon movement of the plug in the direction in which said probe extends from said casing,
   an electrical circuit including a pair of contacts associated with said casing, one of which contacts is connected to one of said terminals,
   electrical supply conductors, connected respectively to the other of said contacts and the other of said terminals, for connecting said circuit to a source of electric current,
   temperature responsive means arranged in good heat transfer relation to said probe for opening said contacts in response to increase above a predetermined value in temperature received by said probe, and
   a warming heater disposed in said probe and connected in shunt with said contacts, whereby said warming heater is short circuited when said contacts are closed, but is connected in series with said one terminal when said contacts are open, said warming heater being of high resistance and of sufficient heating capacity to warm the contents of a vessel with which the control plug may be associated and to supply sufficient heat to said temperature responsive means to maintain said contacts continuously in open position,
   the circuit through the warming heater not being interrupted by said temperature responsive means when said contacts are open.

9. A temperature control plug for use with an electric cooking vessel comprising
a casing,
a heat conducting probe extending from said casing,
terminals adjacent said probe arranged to engage other terminals upon movement of the plug in the direction in which said probe extends from said casing,
an electrical circuit including a pair of contacts associated with said casing, one of which contacts is connected to one of said terminals,
electrical supply conductors, connected respectively to the other of said contacts and the other of said terminals, for connecting said circuit to a source of electric current,
temperature responsive control means disposed within said casing and in good heat transfer relation to, but outside of, said probe for opening said contacts in response to increase above a predetermined value in temperature received by said probe, and
a warming heater disposed in said probe and connected in shunt with said contacts, whereby said warming heater is short-circuited when said contacts are closed, but is connected in series with said one terminal when said contacts are open.

10. An electrical energy conducting and temperature controlling plug for an electrically heated vessel comprising
a casing,
a heat conducting probe extending from said casing,
a warming heater disposed in said probe for heating the contents of a vessel to which the plug may be connected,
terminals adjacent said probe arranged to engage terminals of an electrically heated vessel upon movement of the plug in the direction in which said probe extends from said casing,
electrical supply conductors,
circuit means connected to said supply conductors for energizing said warming heater and said terminals,
switching means in said circuit means for controlling energization of said terminals,
said switching means including a pair of contacts, one of which contacts is connected to one of said terminals, and having a first position wherein said contacts are closed to energize said terminals and a second position wherein said contacts are open, and
temperature responsive means including a temperature responsive element disposed outside of said probe but associated with said casing in such position as to be in good heat transfer relation to the contents of a vessel to which the plug may be connected, said temperature responsive means actuating said switching means from said first position to said second position in response to increase above a predetermined value in the temperature of said temperature responsive element and maintaining said switching means in said second position at all times that said temperature remains above said value,
said warming heater being effective when said switching means is in said second position to supply sufficient heat for heating the contents of the vessel to which the plug may be connected.

11. An electrical energy conducting and temperature controlling plug for an electrically heated vessel comprising
a casing,
a heat conducting probe extending from said casing,
a warming heater disposed in said probe for heating the contents of a vessel to which the plug may be connected,
terminals adjacent said probe arranged to engage terminals of an electrically heated vessel upon movement of the plug in the direction in which said probe extends from said casing,
an electrical circuit for said warming heater and for said terminals and including a pair of contacts associated with said casing, one of which contacts is connected to one of said terminals,
an electric supply cord for connecting said circuit to a source of electric current,
said contacts being connected in shunt with said warming heater whereby said warming heater is short circuited when said contacts are closed but is connected in said circuit in series with said one terminal when said contacts are open, and
temperature responsive means including a temperature responsive element disposed outside of said probe but associated with said casing in such position as to be in good heat transfer relation to the contents of a vessel to which the plug may be connected, said temperature responsive means operating to open said contacts and thereby to render said warming heater effective in response to increase above a predetermined value in the temperature of said temperature responsive element.

12. An electrical energy conducting and control plug for an electrically heated vessel comprising
a casing,
terminals arranged to engage terminals of a vessel to which the plug may be connected,
a warming heater associated with said casing for keeping warm the contents of a vessel to which the plug may be connected,
a heat conducting member associated with said casing,
electrical supply conductors,
circuit means connected to said supply conductors for energizing said terminals and said warming heater,
switching means in the circuit means for controlling energization of said terminals and said warming heater and including a pair of contacts for controlling energization of said terminals,
said switching means having a first position wherein said warming heater is de-energized and said contacts are closed to energize said terminals and a second position wherein said warming heater is energized and said contacts are opened, and
means responsive to increase above a predetermined value in the temperature of said heat conducting member for actuating said switching means from said first to said second position,
said warming heater and said heat conducting member being disposed so that they are brought into heat transfer relation to the vessel when the plug is moved to bring its terminals into engagement with the terminals of a vessel, and
said temperature responsive means maintaining said switching means in said second position at all times, after the shift from the first to the second position, that said temperature remains above said predetermined value.

13. An electrical energy conducting and control plug for an electrically heated vessel as set forth in claim 12 wherein said warming heater is connected in shunt with said pair of contacts.

14. A temperature control and heating device comprising
a probe of heat conducting material and of tubular form having a radially inwardly directed flange at one end,
a warming heater within said probe,
a thermostat stack disposed outside of said probe and comprising first and second contact arms and a bimetal arm disposed in stacked relation with the bimetal arm in contact with said probe, and
a member, formed with an outwardly-extending flange disposed within said probe and engaging the inner side of the flange of said probe, for retaining said arms and the flange of said probe in stacked relation,
said bimetal arm being operable to move one of said contact arms out of engagement with the other upon increase above a predetermined temperature, said first and second contact arms being connected to the opposite terminals of said warming heater respectively, and the circuit through the warming heater not being interrupted by said temperature responsive means when said contacts are open.

15. The combination with a cooking vessel provided with a main heater having electrical terminals, of a control plug or unit attachable to and detachable from said vessel and including electrical terminals adapted to be engaged with said main heater terminals, a warming heater for keeping warm the contents of said vessel, a heat conducting member, said warming heater and said heat conducting member being disposed in relation to the terminals of the plug so that they are brought into heat transfer relation to the contents of said vessel when the terminals of the control plug are engaged with the main heater terminals, electrical supply conductors, circuit means connected to said supply conductors for energizing said terminals and said warming heater, switching means in the circuit means for controlling said main heater, said switching means having a first position in which said main heater is rendered effective and a second position in which said main heater is rendered substantially ineffective, temperature responsive means responsive to the temperature of said heat conducting member and operable to actuate said switching means to said first position and thereby to render said main heater effective when the temperature of the heat conducting member is below a predetermined value and operable upon increase in said temperature above a predetermined value to actuate said switching means to said second position and thereby to render said main heater substantially ineffective, and means for rendering said warming heater effective when the temperature of said conducting member exceeds said last-mentioned predetermined value, to supply sufficient heat to keep warm the contents of said vessel and sufficient heat to said temperature responsive means to maintain its temperature above the value at which it returns said switching means to its first position.

16. The combination with a cooking vessel provided with a main heater having electrical terminals, of a control plug or unit attachable to and detachable from said vessel and including electrical terminals adapted to be engaged with said main heater terminals, a warming heater for keeping warm the contents of said vessel, a heat conducting member, said warming heater and said heat conducting member being disposed in relation to the terminals of the plug so that they are brought into heat transfer relation to the contents of said vessel when the terminals of the control plug are engaged with the main heater terminals, electrical supply conductors, circuit means connected to said supply conductors for energizing said terminals and said warming heater, switching means in the circuit means for controlling said main heater and said warming heater, said switching means having a first position in which said main heater is rendered effective and said warming heater is rendered ineffective and a second position in which said main heater is rendered substantially ineffective and said warming heater is rendered effective, and temperature responsive means responsive to temperature of said heat conducting member and in heat transfer relation to said warming heater, and operable to actuate said switching means from said first to said second position when the temperature of the heat conducting member is below a predetermined value and operable upon increase in said temperature above a predetermined value to actuate said switching means from said first position to said second position to supply sufficient heat to the contents of the vessel to maintain the same warm and also sufficient heat to the temperature responsive means to cause the same to maintain said switching means in said second position.

17. The combination with a cooking vessel provided with a main heater having electrical terminals, of a control plug or unit attachable to and detachable from said vessel and including electrical terminals adapted to be engaged with said main heater terminals, electrical supply conductors, circuit means connected to said supply conductors for energizing said main heater and including switching means having a pair of contacts connected in series with said main heater through an engaged pair of said terminals for controlling energization thereof, a warming heater for keeping warm the contents of said vessel, said warming heater being of higher resistance than said main heater and being connected in shunt with said contacts, a heat conducting member, said warming heater and said heat conducting member being disposed in relation to the terminals of the plug so that they are brought into heat transfer relation to the contents of said vessel when the terminals of the control plug are engaged with the main heater terminals, and temperature responsive means responsive to the temperature of said heat conducting member and in heat transfer relation to said warming heater and operable to maintain said switching means in a first position to render said main heater effective and said warming heater ineffective when the temperature of said heat conducting member is below a predetermined value and operable in response to increase in temperature of the heat conducting member above a predetermined value to actuate said switching means from said first to a second position to render said main heater substantially ineffective and said warming heater effective, said warming heater providing sufficient heat to the contents of the vessel to maintain the contents warm and sufficient heat to the temperature responsive means to cause it to maintain said switching means in said second position.

References Cited in the file of this patent

UNITED STATES PATENTS

| | | |
|---|---|---|
| 1,750,907 | Skold | Mar. 18, 1930 |
| 1,912,921 | Spencer | June 6, 1933 |
| 1,964,732 | Homan | July 3, 1934 |
| 1,984,129 | Green | Dec. 11, 1934 |
| 2,106,756 | Obermaier | Feb. 1, 1938 |
| 2,179,936 | Keene | Nov. 14, 1939 |
| 2,610,284 | Kolisch | Sept. 9, 1952 |
| 2,641,668 | Larocco | June 9, 1953 |
| 2,767,925 | Arnold | Oct. 23, 1956 |
| 2,847,553 | Smith | Aug. 12, 1958 |
| 2,936,359 | Sheahan | May 10, 1960 |
| 2,956,136 | Schwaneke | Oct. 11, 1960 |